(12) United States Patent
Bennett et al.

(10) Patent No.: US 11,110,931 B2
(45) Date of Patent: Sep. 7, 2021

(54) RANGE EXTENDER CONTROL

(71) Applicant: Tevva Motors Limited, Chelmsford (GB)

(72) Inventors: Asher Bennett, Brentwood (GB); Richard Lidstone-Scott, Chelmsford (GB); David Hampton, Chelmsford (GB); Tomasz Kusmierz, Chelmsford (GB); Robert Watson, Olney (GB); John Hankinson, Feltham (GB)

(73) Assignee: TEVVA MOTORS LIMITED

( * ) Notice: Subject to any disclaimer, the term of this patent is extended or adjusted under 35 U.S.C. 154(b) by 24 days.

(21) Appl. No.: 16/075,650

(22) PCT Filed: Feb. 6, 2017

(86) PCT No.: PCT/GB2017/050297
§ 371 (c)(1),
(2) Date: Aug. 4, 2018

(87) PCT Pub. No.: WO2017/134471
PCT Pub. Date: Aug. 10, 2017

(65) Prior Publication Data
US 2019/0047572 A1    Feb. 14, 2019

(30) Foreign Application Priority Data
Feb. 5, 2016  (GB) .................................... 1602112

(51) Int. Cl.
*B60W 40/02*    (2006.01)
*B60W 50/00*    (2006.01)
(Continued)

(52) U.S. Cl.
CPC ............... *B60W 40/02* (2013.01); *B60K 6/46* (2013.01); *B60L 15/2045* (2013.01);
(Continued)

(58) Field of Classification Search
CPC ...... B60W 40/02; B60W 10/26; B60W 20/12; B60W 10/08; B60W 10/06; B60W 20/13; B60W 20/40; B60W 50/0097; B60W 2552/05; B60W 2555/20; B60W 2555/60; B60W 2556/50; B60W 2710/09; B60W 20/18; B60L 15/2045; B60L 50/61;
(Continued)

(56) References Cited

U.S. PATENT DOCUMENTS 5,815,824 A       9/1998 Saga et al.
2012/0255799 A1*  10/2012 Kohler ................. B60L 11/126
                                                180/65.245
(Continued)

FOREIGN PATENT DOCUMENTS

DE    102010039653    2/2012
DE    102010043690    5/2012
(Continued)

*Primary Examiner* — Marthe Y Marc-Coleman
(74) *Attorney, Agent, or Firm* — McDonnell Boehnen Hulbert & Berghoff LLP (57) ABSTRACT

A method of controlling a range extender of an electric vehicle comprises using actual measured or modelled pollution levels dynamically to set a target state of charge level for a range extender of an electric vehicle at a particular location.

20 Claims, 9 Drawing Sheets (51) Int. Cl.
*B60W 10/26* (2006.01)
*B60K 6/46* (2007.10)
*B60L 15/20* (2006.01)
*B60W 20/12* (2016.01)
*B60L 50/61* (2019.01)
*B60L 58/12* (2019.01)
*B60W 10/08* (2006.01)
*B60W 10/06* (2006.01)
*B60W 20/13* (2016.01)
*B60W 20/40* (2016.01)
*G01C 21/26* (2006.01)

(52) U.S. Cl.
CPC ............... *B60L 50/61* (2019.02); *B60L 58/12* (2019.02); *B60W 10/06* (2013.01); *B60W 10/08* (2013.01); *B60W 10/26* (2013.01); *B60W 20/12* (2016.01); *B60W 20/13* (2016.01); *B60W 20/40* (2013.01); *B60W 50/0097* (2013.01); *G01C 21/26* (2013.01); *B60L 2240/62* (2013.01); *B60L 2240/64* (2013.01); *B60L 2240/66* (2013.01); *B60L 2240/70* (2013.01); *B60L 2260/52* (2013.01); *B60L 2260/58* (2013.01); *B60L 2270/12* (2013.01); *B60L 2270/142* (2013.01); *B60W 2552/05* (2020.02); *B60W 2555/20* (2020.02); *B60W 2555/60* (2020.02); *B60W 2556/50* (2020.02); *B60W 2710/09* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/16* (2013.01)

(58) Field of Classification Search
CPC .. B60L 58/12; B60L 2240/62; B60L 2240/64; B60L 2260/58; B60L 2240/70; B60K 6/46; G01C 21/26; Y02T 10/7283; Y02T 10/6217; Y02T 10/7077; Y02T 10/7044; Y02T 10/705; Y02T 10/645; Y02T 90/162; Y02T 10/7291; Y02T 10/7005; Y02T 90/16; Y02T 10/72
USPC .......................................................... 701/22
See application file for complete search history.

(56) References Cited

U.S. PATENT DOCUMENTS

2015/0134174 A1    5/2015  Preece
2015/0285161 A1*  10/2015  Ulrey .................... B60W 20/16
                                                                    477/3
2015/0298555 A1   10/2015  Bennett et al.

FOREIGN PATENT DOCUMENTS

DE    102010044089        5/2012
DE    112011102395 T5     5/2013
DE    102013223491        5/2015
EP        2689982          1/2014

\* cited by examiner

RANGE EXTENDER CONTROL

This application is a national stage entry of, and claims the benefit of, International (PCT) Application No. PCT/GB2017/050297, filed Feb. 6, 2017, which claims priority to United Kingdom Patent Application No. 1602112.3, filed Feb. 5, 2016, each of which is fully incorporated herein by reference.

This invention relates to an apparatus and method for controlling a range extender of an electric vehicle, and to an associated computer program.

Electric vehicles take a variety of forms, namely pure electric (where the only source of power is a battery), parallel hybrid (where an internal combustion engine or battery may drive the wheels), or series hybrid vehicles where a secondary power source re-charges an on-board battery (a range extender). The present invention is primarily concerned with the latter.

Figure 3:
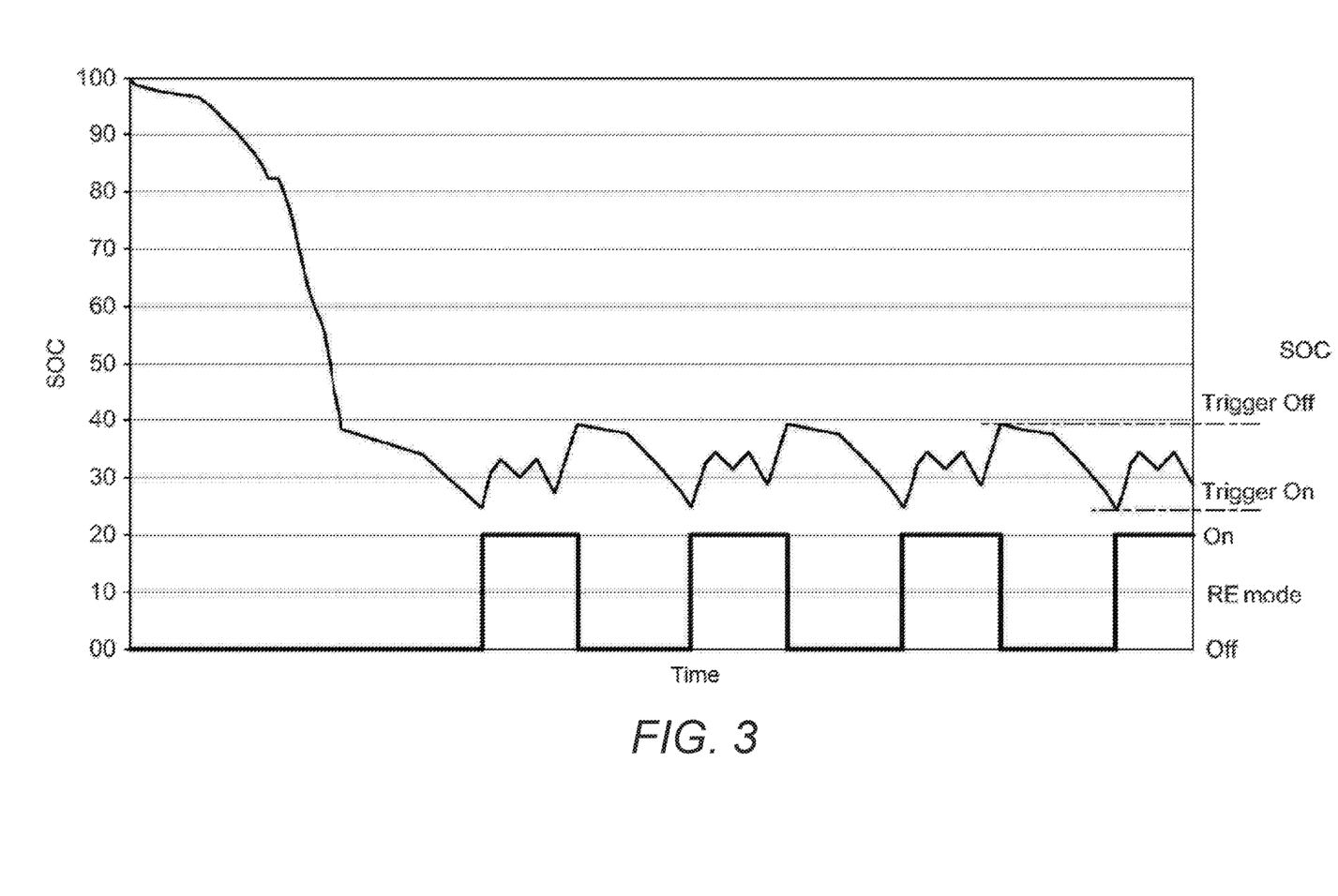
FIG. 3 shows a prior art range-extender management graph.

One known approach for operating vehicles with range extending functionality is shown in FIG. 3 (referred to as the 'basic model'). Using this approach, the vehicle is operated purely as an electric vehicle until a predetermined level of charge is reached, at which point the range extender is switched on—and will remain on—until an upper state of charge (SOC) level is reached.

In this basic model, the range extender (RE) is switched on at full power when the SOC reaches the lower threshold; charge is then increased until the upper threshold is reached. The 'on time' of the range extender is indicated by 'RE State' 1 being fully on, and 0 being off. This is sometimes referred to as charge depleting/charge sustaining modes (this is a baseline example with another possibility being when the charge sustaining mode is on at less than full power e.g. at efficient power).

The basic model is inefficient because the range extender is typically only used at maximum power (as opposed to where it is most efficient), it does not take into account the most opportune times for range extender usage (only taking into account SOC) and the battery pack will have surplus charge available at the end of the journey (partly generated by the range extender) that could have been used during the discharge cycle. This unused power generated by the range extender will be inherently more expensive than plug in power from the grid. An improved solution is therefore required.

The present invention aims to alleviate at least some of the aforementioned problems.

According to one aspect of the present invention there is provided a method of controlling a range extender of an electric vehicle, the method including: using actual measured or modelled pollution levels dynamically to set a target state of charge level for a range extender of an electric vehicle at a particular location.

Using actual measure pollution levels may include measuring a dynamic level of pollution at one or more locations.

Using modelled pollution levels may include generating a dynamic model of pollution; and using the generated model to calculate the modelled pollution level at one or more locations including the particular location at a current or future point in time.

Setting the target state of charge level of the range extender may include using a journey plan comprising one or more locations to which the electric vehicle is projected to travel to set the particular location; and setting the target state of charge level of the range extender for the particular location to which the electric vehicle is projected to travel.

Setting the state of charge level of the range extender may include using the modelled pollution level for the particular location to which the electric vehicle is projected to travel at a projected arrival time of the electric vehicle at the particular location.

The particular location may be a current location of the electric vehicle.

Using actual measured pollution levels may include measuring a current level of pollution at the current location of the electric vehicle using one or more sensors arranged on the electric vehicle.

The method may include detecting the current location of the electric vehicle and limiting the operating level of the range extender based on the maximum operating level of the range extender set for the electric vehicle at the current location.

The method may include identifying a projected route for the electric vehicle; and setting a target state of charge profile comprising the target state of charge level set for a plurality of locations on the projected route.

The method may include calculating a journey itinerary comprising a plurality of locations on the projected route and a projected arrival time of the electric vehicle at each location.

Setting the target state of charge profile may include setting the target state of charge level for each location at the projected arrival time of the electric vehicle.

The actual measured or modelled levels of pollution may include levels of oxides of carbon or nitrogen, hydrocarbons, particulates or noise at one or more locations.

According to another aspect of the present invention there is provided an apparatus for controlling a range extender of an electric vehicle, the apparatus being configured to use actual measured or modelled pollution levels dynamically to set a target state of charge level for a range extender of an electric vehicle at a particular location.

The apparatus may measure a dynamic level of pollution at one or more locations.

The apparatus may generate a dynamic model of pollution; and use the generated model to calculate the modelled pollution level at one or more locations including the particular location at a current or future point in time.

The apparatus may use a journey plan comprising one or more locations to which the electric vehicle is projected to travel to set the particular location; and set the target state of charge level of the range extender for the particular location to which the electric vehicle is projected to travel.

The apparatus may use the modelled pollution level for the particular location to which the electric vehicle is projected to travel at a projected arrival time of the electric vehicle at the particular location.

The particular location may be a current location of the electric vehicle.

The apparatus may measure a current level of pollution at the current location of the electric vehicle using one or more sensors arranged on the electric vehicle.

The apparatus may detect the current location of the electric vehicle and limit the operating level of the range extender based on the maximum operating level of the range extender set for the electric vehicle at the current location.

The apparatus may identify a projected route for the electric vehicle; and set a target state of charge profile comprising the target state of charge level set for a plurality of locations on the projected route.

The apparatus may calculate a journey itinerary comprising a plurality of locations on the projected route and a projected arrival time of the electric vehicle at each location.

The apparatus may set the target state of charge level for each location at the projected arrival time of the electric vehicle.

The actual measured or modelled levels of pollution may include levels of oxides of carbon or nitrogen, hydrocarbons, particulates or noise at one or more locations.

According to another aspect of the present invention there is provided a computer program for controlling a range extender of an electric vehicle, the computer program comprising software code which, when executed on a data processing apparatus, use actual measured or modelled pollution levels dynamically to set a target state of charge level for a range extender of an electric vehicle at a particular location.

The computer program may measure a dynamic level of pollution at one or more locations.

The computer program may generate a dynamic model of pollution; and use the generated model to calculate the modelled pollution level at one or more locations including the particular location at a current or future point in time.

The computer program may use a journey plan comprising one or more locations to which the electric vehicle is projected to travel to set the particular location; and set the target state of charge level of the range extender for the particular location to which the electric vehicle is projected to travel.

The computer program may use the modelled pollution level for the particular location to which the electric vehicle is projected to travel at a projected arrival time of the electric vehicle at the particular location.

The particular location may be a current location of the electric vehicle.

The computer program may measure a current level of pollution at the current location of the electric vehicle using one or more sensors arranged on the electric vehicle.

The computer program may detect the current location of the electric vehicle and limit the operating level of the range extender based on the maximum operating level of the range extender set for the electric vehicle at the current location.

The computer program may identify a projected route for the electric vehicle; and set a target state of charge profile comprising the target state of charge level set for a plurality of locations on the projected route.

The computer program may calculate a journey itinerary comprising a plurality of locations on the projected route and a projected arrival time of the electric vehicle at each location.

The computer program may set the target state of charge level for each location at the projected arrival time of the electric vehicle.

The actual measured or modelled levels of pollution may include levels of oxides of carbon or nitrogen, hydrocarbons, particulates or noise at one or more locations.

Further features of the invention are characterised by the independent and dependent claims.

Any feature in one aspect of the invention may be applied to other aspects of the invention, in any appropriate combination. In particular, method aspects may be applied to apparatus aspects, and vice versa. The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein. The invention also provides a computer readable medium having stored thereon the computer program as aforesaid.

The invention also provides a signal carrying the computer program as aforesaid, and a method of transmitting such a signal.

Furthermore, features implemented in hardware may be implemented in software, and vice versa. Any reference to software and hardware features herein should be construed accordingly. Any apparatus feature as described herein may also be provided as a method feature, and vice versa. As used herein, means plus function features may be expressed alternatively in terms of their corresponding structure, such as a suitably programmed processor and associated memory. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

The invention extends to methods and/or apparatus substantially as herein described with reference to the accompanying drawings.

Purely by way of example, the present invention is now described with reference to the accompanying drawings in which.

Figure 1:
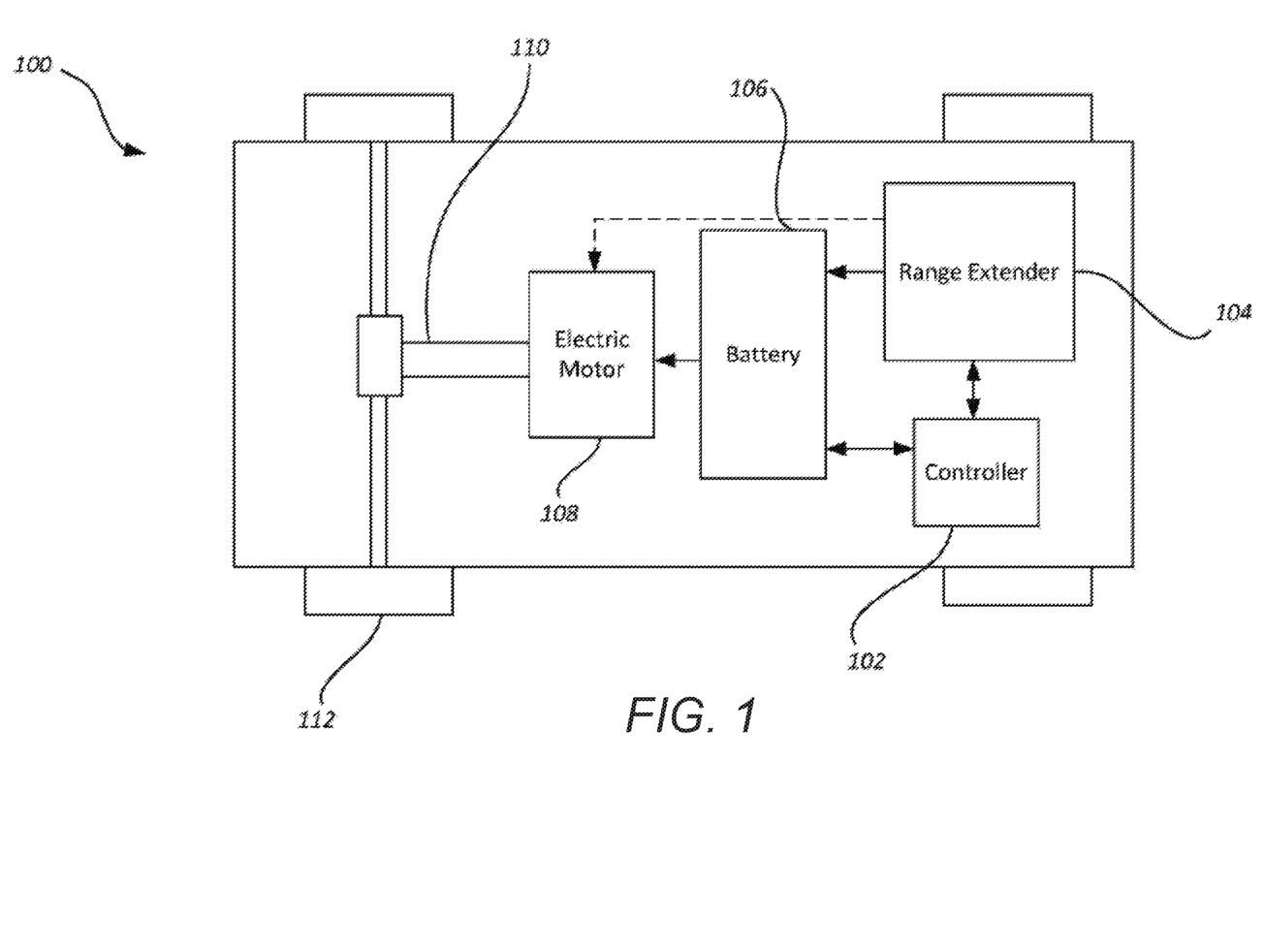
FIG. 1 is a schematic diagram of a range-extended electric vehicle.

A range extended electric vehicle 100 is shown schematically in FIG. 1. The vehicle includes an apparatus for activating a range extender 104 within the electric vehicle 100, in the form of a controller 102 connected to and in communication with the range extender 104 and a battery 106, typically in the form of a battery pack. The range extender 104 is a secondary source of power, for example a diesel internal combustion engine or hydrogen fuel cell, connected to an electric generator. The range extender is connected to the battery so as to re-charge it via the generator (the circuitry necessary for this has been omitted from the drawing for clarity). The range extender 104 (via the generator) may also directly power the electric motor 108; this is only performed in certain circumstances described in more detail below.

Operation of an internal combustion engine results in a number of emissions, including unwanted emissions which may be harmful to the environment or the heath and well-being of an individual. Examples of unwanted emissions include carbon dioxide ($CO_2$) and carbon monoxide (CO), oxides of nitrogen ($NO_X$), hydrocarbons ($C_XH_Y$) and particulate matter e.g. soot. Operation of the internal combustion engine further results in the unwanted emission of noise, which typically increases in dependence on the power output of the engine. In the following description, the term "emissions" is inclusive of gaseous emissions, particulate emissions, noise emissions and further includes any other unwanted effects of the internal combustion engine on the surrounding environment.

Emissions of any type resulting from the operation of the internal combustion engine contribute to a level of pollution in the vicinity of the internal combustion engine. The level of pollution at any particular location may indication the level of carbon dioxide ($CO_2$) or carbon monoxide (CO), oxides of nitrogen ($NO_X$), hydrocarbons ($C_XH_Y$), particulate matter or noise at the particular location. In the following description, the term "pollution" is inclusive of gaseous pollution, particulate pollution and noise pollution at a particular location.

The battery 106 supplies power to an electric motor 108, which drives the wheels 112 via a transmission means such as a drive-shaft 110.

Figure 2:
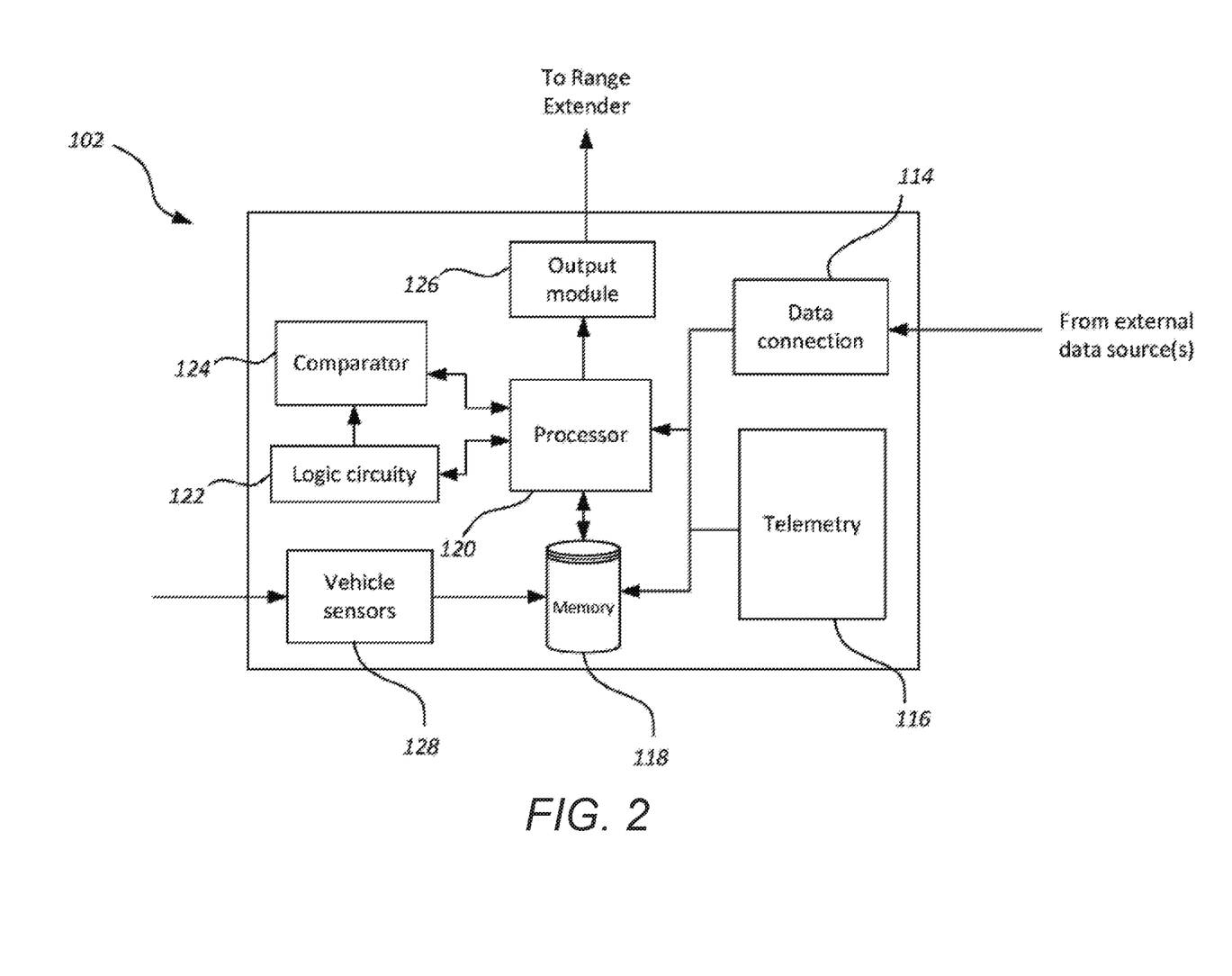
FIG. 2 is a schematic circuit-diagram of a controller for controlling the operation of a range extender.

FIG. 2 shows a schematic representation of the controller 102 capable of controlling the range extender 104 to follow a particular activation schedule which is stored in a memory 118. The controller 102 comprises a data connection 114 for receiving/retrieving data (such as journey itinerary information and power usage information) from external sources. This may be a physical connection, such as a Universal Serial Bus (USB) connection, or a wireless connection, such as General Packet Radio Service (GPRS), Global System for Mobile Communications (GSM), Universal Terrestrial Radio Access Network (UTRAN), Evolved UTRAN (E-UTRAN), Code Division Multiple Access (CDMA), Long Term Evolution (LTE), Worldwide Interoperability for Microwave Access (WiMax), or Bluetooth®. The controller 102 further comprises a telemetry unit 116. This unit includes a package of sensory or measurement instruments operable to sense or detect and record various parameters relating to the vehicle and journey (further journey information). Examples of such instruments include: a Global Positioning System (GPS), accelerometer, temperature/weather sensors, motor monitoring devices, and devices that monitor power usage/battery health. Further instruments may monitor pollution in the immediate vicinity of the vehicle, for example, the level of carbon dioxide and carbon monoxide, oxides of nitrogen, hydrocarbons, particulates and noise may be measured at the front of the vehicle and/or the rear of the vehicle.

The data from these various instruments is stored in the local memory 118 with the aid of processor 118. Local memory 118 also comprises information relating to previous journeys, such as telemetric data or measured levels of pollution relating to previous journeys. This information may have been imported to the controller 102 from an external source, determined from on-board measurements made on a previous journey, or a combination thereof. The information can be used when determining whether or not to activate the range extender, i.e. in setting a target state of charge (SOC) profile for a current journey. Such a target SOC profile may be determined by processing data retrieved (from local memory or from an external source) on-board, or the processing of the data may be performed remotely (for example in the 'cloud') and transmitted to the device memory 118 via data connection 114. Logic circuitry 122 and comparator circuitry 124, with the aid of processor 120, determine if the conditions for activation of the range extender are met, and if so, the processor 120 sends a signal to the range extender via output module 126.

The controller 102 further comprises vehicle parameter sensors 128, which monitor parameters such as: the state of charge (SOC) of the battery, battery state of health (Battery Management System) and motor speed. Such sensors may be connected to a bus (for example a CANbus (Controller Area Network bus) to allow communication between them and the controller 102). This information is stored in memory 118 and is used when determining whether or not to activate the range extender 104. The controller 102 may further comprise user interface components such as a display screen and/or keypad for users to manually input data (for example, to identify the driver); these are not shown for clarity, and would typically be wirelessly connectable to the controller 102 and implemented in a separate computing device such as a smartphone or tablet. Alternatively or additionally, an application may be provided on a separate user device (such as a smartphone or tablet device) to record/receive data to be used by the controller.

FIG. 3 shows a state of charge against time and an activation state for the operation of a conventional range extender model. The conventional range extender is operated according to a constant target SOC only. FIG. 3 will be used as a reference and example in this detailed description.

The range extender is configured to turn on at maximum efficiency if the battery SOC falls below a target level. If the battery SOC is much less than the target level, then the range extender may be switched onto full power.

The "trigger on" level at which the SOC is determined to be less than (<) the target is a parameter that can be set depending on the particular implementation. This may be, for example, a level 5% lower than the target, i.e. the SOC is 25% when the target is 30%. Similarly, a level at which the SOC is determined to be much less than («) the target is also a parameter that can be set depending on the particular implementation. This level may be 10% lower, for example, the SOC is 20% when the target is 30%.

If the battery SOC rises above the target level, then the range extender is configured to turn off. The "trigger off" level at which the SOC is determined to be greater than (>) the target is a parameter that can be set depending on the particular implementation. For example, this may be a level 10% higher than the target, i.e. the SOC is 40% when the target is 30%.

The range extender may also be used only at a low level when the vehicle is travelling at low speeds as at such times the noise of the range extender is most noticeable. Low speeds may be defined less than 30 miles per hour, more preferably less than 20 miles per hour. Table 1 below illustrates these various example operational modes:

TABLE 1

Example range extender operational modes

| State of Charge/ | Range Extender operation | |
| --- | --- | --- |
| Discharge | High Speeds | Low Speeds |
| SOC < target level | On - maximum efficiency | On - low power |
| SOC << target level | On - full power | On - low power |
| SOC > target level | Off | Off |

Figure 4:
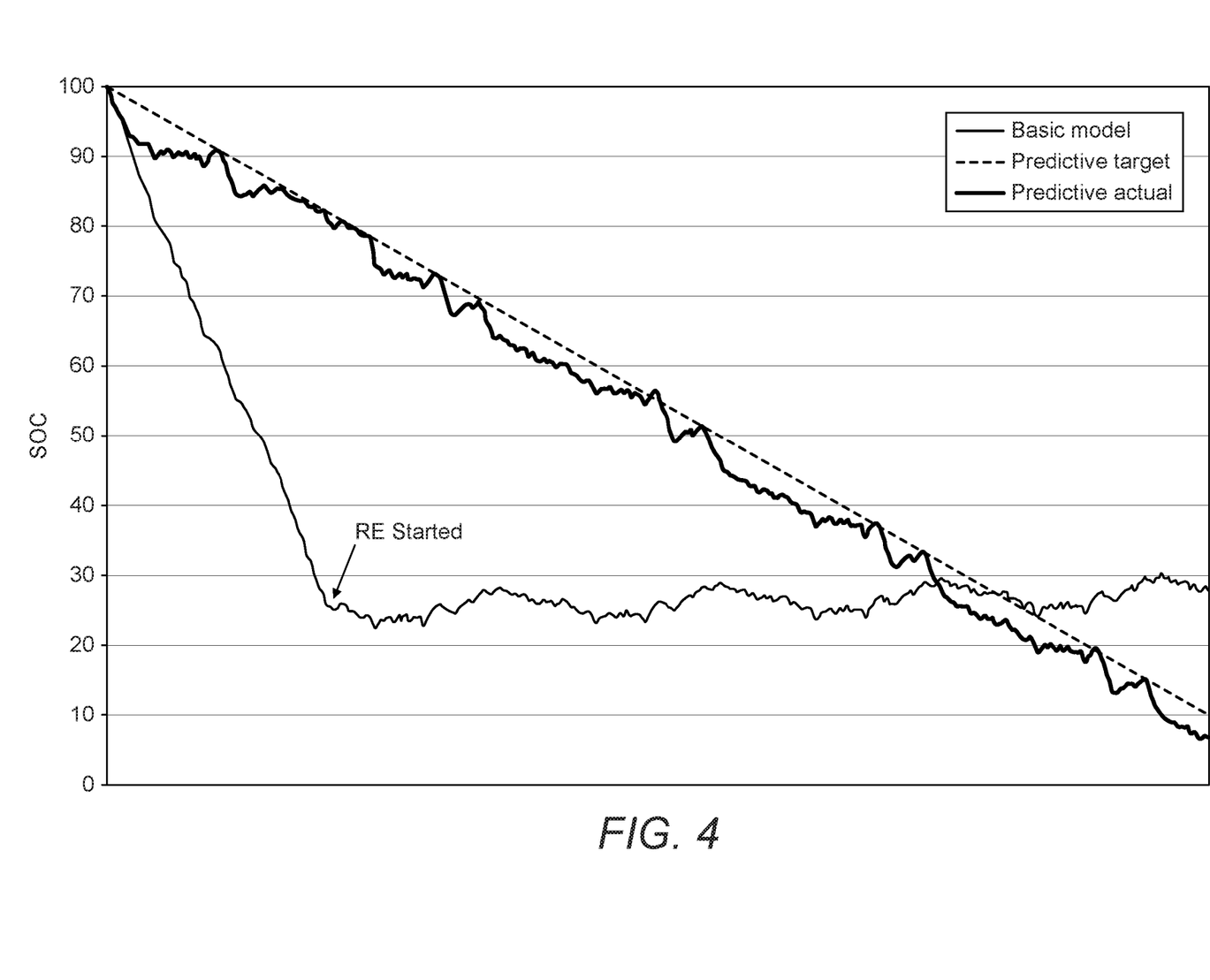
FIG. 4 shows a 'predictive' model superimposed over the 'basic' model of FIG. 3.

FIG. 4 shows the state of charge against time for the conventional range extender model, operated according to a constant target SOC, in comparison with a simple predictive range extender model. The predictive range extender model is operated according to a generated target SOC profile.

The basic target SOC profile is set to reduce linearly based on the expected journey duration towards an end SOC level of 10%. The trigger values, for example, SOC is 5% lower than the target, are applied in the same way with respect to the decreasing target level.

By using predictive management, the range extender can be used where it is most efficient rather than at maximum power (for example). Although the range extender may be on for a longer overall duration than in the basic model it will primarily be running at its most efficient—and will therefore use less fuel than the basic model. This will result in lower overall emissions and a reduction in running costs.

Furthermore the range extender can be used to ensure the charge level of the pack is utilised to provide improved overall efficiency. By predicting the end of the journey, the model can reduce the final SOC to 10% (for example) as opposed to the basic model's typical 35% SOC. In this way, approximately 10 kWh of range extender generated power is saved. Instead cheaper plug in electric power is used at the next charge. This also reduces overall emissions as powerplant generated electricity is being used rather than range extender generated electricity.

Alternatively (or in addition), a whole day's range extender usage expectancy may be modelled with a journey itinerary and thus a more precise SOC profile can be determined so that the range extender is only used at the optimal times during the day. Such a profile comprises a desired end SOC and may also account for the most efficient or most suitable time periods in which to increase the target SOC.

For example, rather than discharging the pack using a profile tending linearly down to the final 10% SOC the charge level may initially be maintained at a high level, with the final phase of the discharge being entirely non-sustaining. Additional charging, maintaining, or non-sustaining periods may also be scheduled based on a journey itinerary by altering the linear target SOC profile to a follow a different path.

According to an embodiment, a range extender 104 is provided which is operated according to a dynamic target SOC profile. The target SOC profile of the range extender 104 is generated based on actual measured or modelled pollution levels for a route to be taken by the electric vehicle 100.

Figure 5:
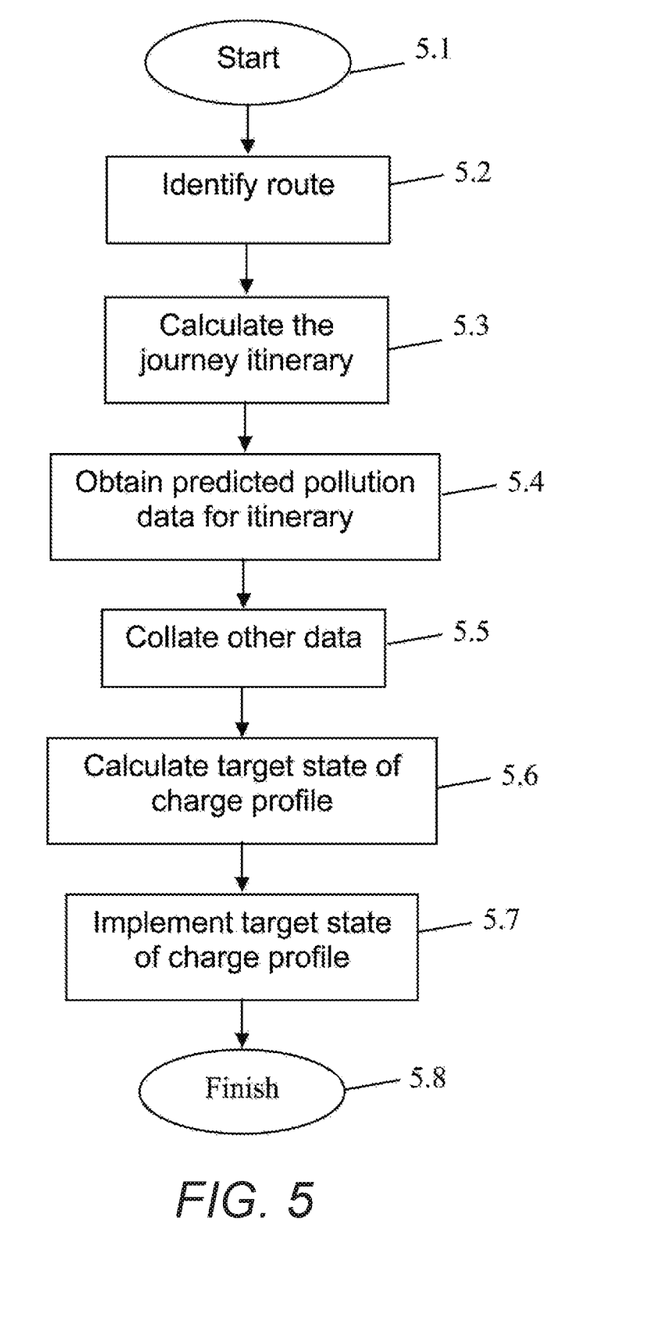
FIG. 5 is a flowchart showing an operation method for the controller of FIG. 2.

With respect to FIG. 5, an operation for the controller 102 is shown, according to an embodiment. The operation is carried out by the controller 102 and, in particular, by the processor 120. Alternatively, the operation may be carried out by a server in communication with the controller 102 via the data connection 114.

The operation starts at step 5.1.

At step 5.2, the controller 102 is configured to identify a route to be taken by the electric vehicle 100. Such a route may be input into the system prior to departure, for example, by a user, or the route information may be imported directly from a server storing daily routes.

The controller 102 may retrieve the route information from the memory 118, or from a server via the data connection 114.

At step 5.3, the controller 102 is configured to calculate a journey itinerary for the electric vehicle 100. The journey itinerary comprises a plurality of waypoints and expected arrival times for the electric vehicle 100. The journey itinerary is based on the route and estimated journey timings for the route. The estimated journey timings may be based on, for example, the average speed of the electric vehicle 100, the local speed limit at each point along the route and the topography of the route. The controller 102 may further account for other factors, e.g. a driver profile indicating the individual driving style of the expected driver, local weather conditions on the route and expected traffic conditions on the route.

At step 5.4, the controller 102 obtains pollution information relating to the upcoming journey. The pollution information comprises actual measured or modelled levels of pollution for one or more points on the journey itinerary. Pollution levels may be linked to a particular geographical area and time in order to provide an expected or predicted level of pollution for each point on a dynamic pollution map. The dynamic pollution map may be configured to show a current level of pollution for a particular geographical area. The dynamic pollution may further show a predicted level of pollution for the geographical area at a particular time.

The pollution information varies across the urban area and may also vary over time. The pollution information comprises actual measured pollution levels or modelled pollution levels for one or more locations. Actual pollution levels are measured by one or more sensors placed at static locations or on the electric vehicle itself. Data from the sensors is provided to a central server or database and is retrieved by the controller 102 to determine and activation schedule of the range extender. Alternatively, data from sensors arranged on the electric vehicle may be stored in the controller memory 118 and retrieved by the controller 102 directly.

A pollution model may be generated for an area in order to calculate pollution levels for one or more locations within the area. The pollution model may be generated using a combination of actual pollution levels measured at locations within the area over a period of time, and scientific predictions based on related data such as traffic data or weather data. Modelled pollution levels may be calculated for a location between sensors for measuring actual pollution levels, and may be projected for a future point in time. Modelled pollution levels may account for changes due to time of day, date, climate, current or forecast weather, calendar events etc. A modelled pollution level may be calculated for a particular location on the journey itinerary at the projected time for the electric vehicle to arrive at the particular location.

The pollution information retrieved by the controller may be related to any form of emissions caused by the operation of the range extender, for example, gaseous oxides of carbon and nitrogen ($CO$, $CO_2$, $NO_X$), hydrocarbons ($C_XH_Y$), particulates and noise emissions.

In some embodiments, the controller 102 may obtain additional or alternative pollution information which relates to allowable levels of pollution. The allowable levels of pollution may also be linked to a particular geographical area and time. A maximum allowable level of pollution may be set according to regulations or legislation.

At step 5.5, the controller 102 is configured to collate other data which is relevant for the operation of the range extender 104. Such data may include, for example, a driver profile indicating the individual driving style of the expected driver, local weather conditions on the route and expected traffic conditions on the route. The controller 102 may take into account ancillary power loads such as lights when part of a journey takes place in the dark, windscreen wipers when part of a journey is expected to take place in the rain, and passenger or payload climate control when external conditions are relatively hot or cold.

The controller 102 may be further account for the expected payload of the vehicle and may take account of, for example, pickup and drop of points. For a taxi or public transport vehicle other data may include expected or predicted passenger pickup/drop-off points. For a delivery vehicle, time-based payload data may be determined based on the delivery point of each item in the electric vehicle 100.

At step 5.6, the controller 102 is configured to calculate the target SOC profile for the route. The target SOC profile specifies the target SOC level for each point along the journey itinerary. The operation of the range extender 104 at a given point in time can be determined according to the location and the target SOC.

Based on the actual measured or modelled level of pollution provided in the pollution information for a particular location on the journey itinerary, the controller 102 sets a target SOC level for the range extender 104 at the particular location. The controller 102 calculates a target SOC level for each upcoming location in the journey itinerary based on a current or projected level of pollution at the upcoming location.

The target SOC profile increases the target SOC levels at the optimal points for the activation of the range extender 104, based on the pollution information. The target SOC level may be lower at points where it is not optimal to activate the range extender.

For example, a drop off point on the upcoming journey itinerary may located in the inner city area. Locations in an urban area may exhibit higher local levels of pollution and, in addition, may have restrictions on the maximum level of pollution. For example, there may be a lower allowable level of particulates as these particulates accumulate in urban areas and may cause health problems. There may be a lower allowable noise level in the inner city at certain times of day, such as the early morning.

Based on the retrieved pollution information which relates to the inner city, the controller 102 may determine that an optimal point for activating the range extender is prior to entering the inner city. The target SOC level may be increased outside the city limits, for example in a non-urban area where noise emissions are less disruptive and particulate emissions disperse harmlessly. The controller 102 may control the range extender 104 to activate prior to entering the inner city, to raise the SOC to the increased target level before reaching the urban area.

The target SOC level may be decreased within the urban area, where emissions of both particulates and noise are undesirable. The controller 102 may control the range extender 104 to turn off within the urban area, allowing the SOC to fall towards the lower target level.

The increased target SOC level in the area preceding the inner city may be sufficiently high that the electric vehicle 100 can operate in a fully electric mode within the city. The stored charge may be sufficient to power the electric vehicle 100 through the inner city portion of the route, without reaching the reduced target SOC level within the urban area. If the journey itinerary through the inner city is too long to operate entirely in the fully electric mode, the controller 102 may set the target SOC profile such that the range extender 104 is operated in the low noise mode.

The controller 102 may further set a maximum operating level for the current location of the electric vehicle 100 based on the pollution information obtained for that location. When the actual measured or modelled level of pollution is high, the controller may set the maximum operating level of the range extender to be a low power mode.

Based on a maximum level of pollution for a particular location and the actual measured or modelled level of pollution at the location, the controller 102 may determine a maximum level of emissions for the range extender of the electric vehicle at the location. The maximum operating level of the range extender is set based on the determined maximum level of emissions at the particular location. The maximum level of pollution may be time dependent and the maximum level of emissions may be calculated based on a projected time of arrival for the electric vehicle at the particular location.

At step 5.7, the controller 102 is configured to implement the target SOC profile. The controller 102 operates the range extender 104 according to the target SOC profile.

Using the comparator 124, the controller 102 is configured to compare the current SOC of the battery 106 with the target SOC level currently set by the target SOC profile. As described above, if the SOC falls below the target SOC level, for example by 5% or more below the target level, then the range extender 104 is activated. If the SOC rises above the target SOC level, for example by 10% or more above the target level, then the range extender 104 is deactivated.

Alternatively, the controller 102 may implement the target SOC profile by transferring the target SOC profile to the range extender 104, for implementation by an integrated controller. Further alternatively, a target SOC profile calculated by a server may be implemented by transmission to the electric vehicle 100, for implementation by the controller 102 as described above.

The operation ends at step 5.8.

Figure 6:
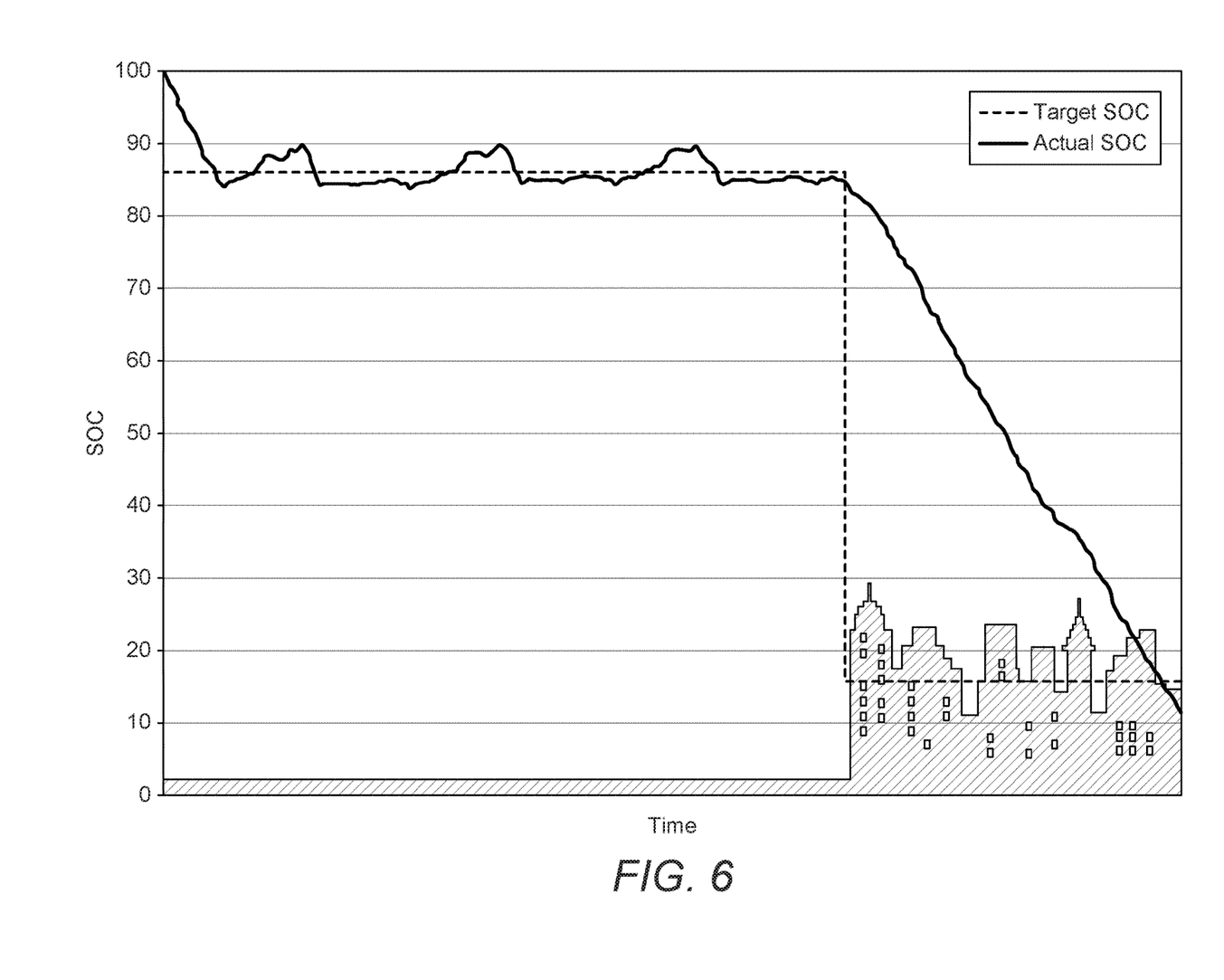
FIG. 6 shows a range-extender management graph for a range extender operated by the controller of FIG. 2.

FIG. 6 shows an exemplary operation of the controller 102 when implementing a target SOC profile over a route. The projected route includes an inner city area, where activation of the range extender 104 would contribute to unwanted noise and particulate matter pollution.

As described above, the range extender 104 is turned off when the SOC rises above the target level, and is turned on again each time the SOC passes below the trigger level for activation. Accordingly the target SOC profile is calculated by the controller 102 to have a high target SOC level outside the urban area of the inner city, and a low target SOC level within the city.

When implementing the target SOC profile generated by the controller 102, the range extender 104 is activated during the first section of the journey to maintain a high level of charge (in this example, 80-90%). The high level of charge is maintained for the first section of the journey by activating the range extender in a maximum efficiency mode.

When the electric vehicle 100 reaches the inner city, the range extender 104 is turned off and the SOC falls towards the lower target SOC level. However, because a high level of charge is maintained early in the journey, the controller 102 allows the range extender to be turned off throughout the inner city, without depleting the SOC to an unacceptable degree. The range extender is turned off and emits no noise and no particulates while the vehicle is in the inner city area.

Figure 7:
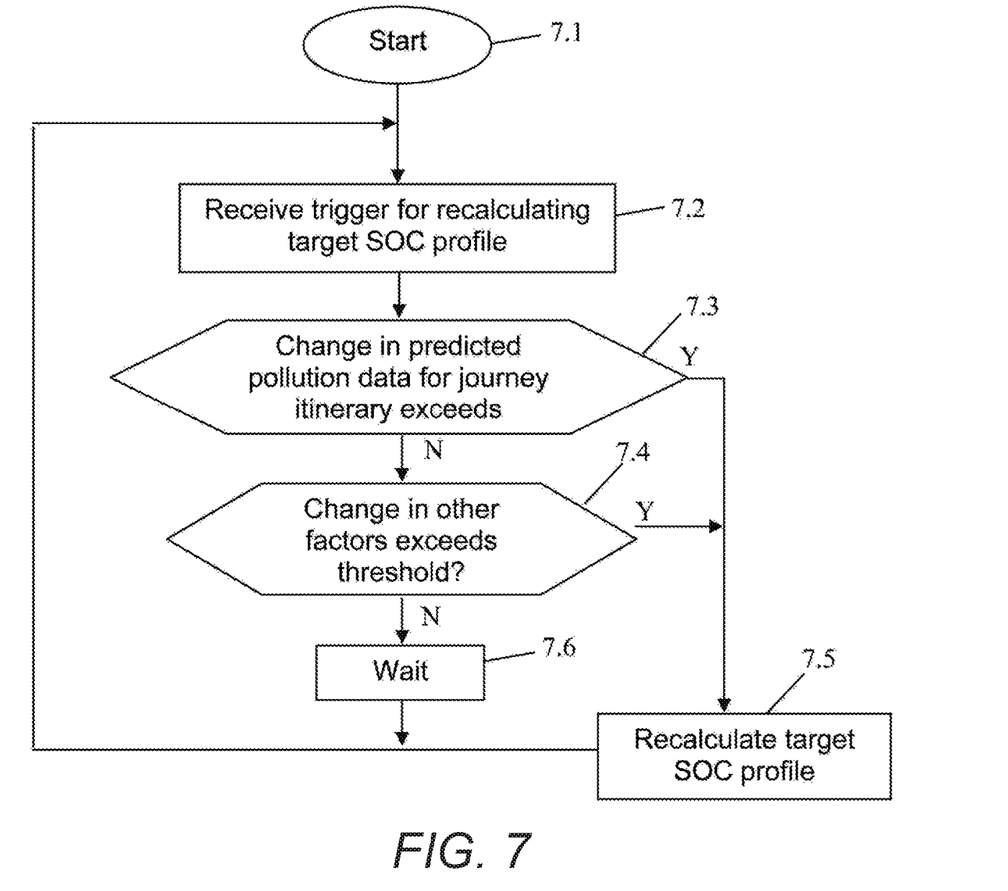
FIG. 7 is a flowchart showing an operation method for the controller of FIG. 2.

With respect to FIG. 7, a further operation for the controller 102 is shown, according to an embodiment. The operation is carried out by the controller 102 and, in particular, by the processor 120. The controller 102 is configured to recalculate the target SOC profile in response to one or more triggers, to ensure that the range extender 104 is operated effectively based on the conditions.

The operation starts at step 7.1.

At step 7.2, the controller 102 receives a trigger for recalculating the target SOC profile.

A trigger may be, for example, an alert from a server received through the data connection 114. The server may monitor the current level of pollution for one or more points along the route and may transmit an alert when the measure level of pollution deviates significantly from the expected level calculated in the dynamic pollution map.

A further trigger may be a deviation from the planned route. The vehicle telemetry 116 may detect that the electric vehicle 100 is off course, and may calculate a new route to reach the next waypoint or final destination. The telemetry 116 may trigger the controller 102 to recalculate the target SOC profile for the new route.

A further trigger may be a deviation from the journey itinerary. For example, the telemetry 116 may detect that the electric vehicle 100 is progressing more slowly or more quickly than expected. The telemetry 116 may further indicate that the electric vehicle 100 is not being driven in accordance with the expected driver profile, e.g. the current driver is less efficient than expected.

A further trigger may be received from the vehicle sensors 128. Various instruments may measure the current level of e.g. particulates or noise pollution, and the controller 102 may receive a trigger to recalculate the target SOC profile based on the current pollution data. For example, if it is detected that the noise level of the electric vehicle wo is actually louder than anticipated, the target SOC profile may have to be altered so as to charge the battery for longer and/or more frequently at an earlier part of the journey, as the noise of the range extender 104 will exceed allowable levels at an early point on entering the city. The controller 102 therefore receives a trigger to recalculate the target SOC profile accordingly.

Alternatively, the controller 102 may receive a trigger to recalculate the target SOC profile automatically after a certain time period. The frequency of recalculation is a factor that is a trade-off between processing power/energy expenditure and the utility of recalculation. Further alternatively, the trigger may be sent to the controller 102 manually by the driver or by a remote operator.

At step 7.3, the controller 102 calculates a change in the predicted levels of pollution for the remaining parts of the journey itinerary. The controller 102 recalculates a predicted level of pollution for each location on the journey itinerary based on the most accurate data available. The controller 102 compares the newly calculated pollution levels with the originally calculated pollution levels and determines the change.

If the change in the predicted levels of pollution exceeds a predetermined threshold, the controller 102 proceeds to step 7.5. If the change in the predicted levels of pollution is within the predetermined threshold, the controller 102 proceeds to step 7.4.

At step 7.4, the change in the predicted levels of pollution is within the predetermined threshold and the controller 102 calculates changes in any other factors considered in the generation of the target SOC profile.

For example, the controller 102 may detect a significant change in the traffic conditions or weather conditions in comparison with the expected. The electric vehicle 100 may not be operating at the expected level of efficiency due to, for example, the style of driving or through a mechanical fault.

If the change in other factors exceeds a predetermined threshold, the controller proceeds to step 7.5. If the change in other factors is within the predetermined threshold, the controller proceeds to step 7.6.

At step 7.5, the controller 102 recalculates the target SOC profile for the remaining journey itinerary. The controller 102 initiates the operation described with respect to FIG. 5, to identify the remaining or updated route, to calculate an updated journey itinerary and to calculate a new target SOC profile based on updated pollution data and other data.

At step 7.6, neither the change in the predicted levels of pollution nor the change in other factors exceeds a threshold, and the controller 102 waits for a further trigger to be received. The controller 102 returns to step 7.2 until a further trigger for reformulating the target SOC profile is received.

In this way, the target SOC profile may be dynamically updated as the electric vehicle 100 progress along the route.

In some embodiments, a planned route may have some information in common with a previous route. A target SOC profile from such previous journeys may optionally be adapted for an upcoming journey to further improve the efficiency of the electric vehicle 100.

The pollution information may also included measured pollution stored during a previous journey or, alternatively, by another vehicle having driven at least a portion of the same route. The target SOC profile may be generated based on the retrieved pollution information, and may be further improved or optimised based on updated pollution information as the journey progresses.

In some embodiments, the activation schedule also identifies when the vehicle is returning back to base and allows the pack to be discharged to its final minimum SOC ready to be recharged with comparatively cheap plug in electricity. If a standard route is taken then the on-board telematics system can learn and identify when the vehicle is returning to base in order to switch out of charge sustaining mode. The activation schedule may determine the expected charge needed to reach base with all the parameters taken into account, including, but not only, range.

If routes are varied then a simple 'geo-fence' can come into effect, when the vehicle enters a certain geographical area (a 'geo-fenced' area or 'geo-zone'). For example, a geo-fenced area may be set as a base area, within a certain distance of the base of the vehicle. The vehicle may be switched out of the charge sustaining mode within the base area. A low level of SOC relief may be provided by the range extender during this phase, e.g. if a very low level of charge is reached, the range extender may be activated so as to avoid completely draining the battery.

In some embodiments, the target SOC of the vehicle may be reduced gradually within the base area. The reduction in target SOC may correspond to the decreasing distance of the vehicle from the base. The reduction in target SOC may be based on a straight line distance from the vehicle to the base.

Figure 8A:
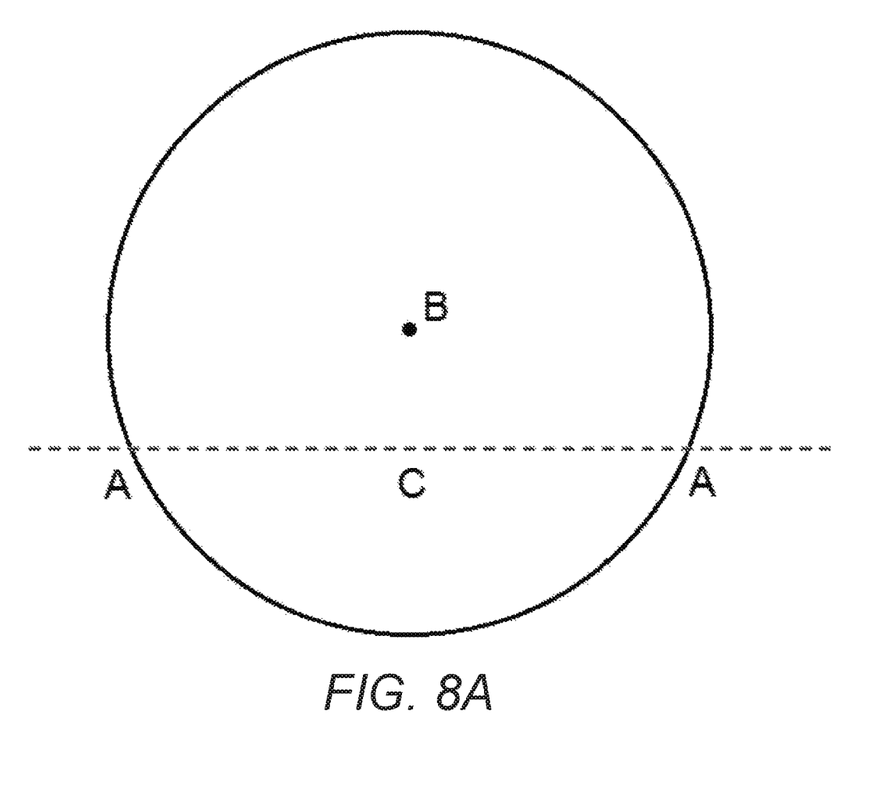
FIG. 8A shows a representation of a vehicle route.

FIG. 8A shows a representation of a route taken by a vehicle through a geo-fenced area. A base area is set at a certain distance from the base B. The vehicle may follow a route along the line from A-A. The vehicle moves closer to the base B, to the point of closet approach C, then away from the base B.

Figure 8B:
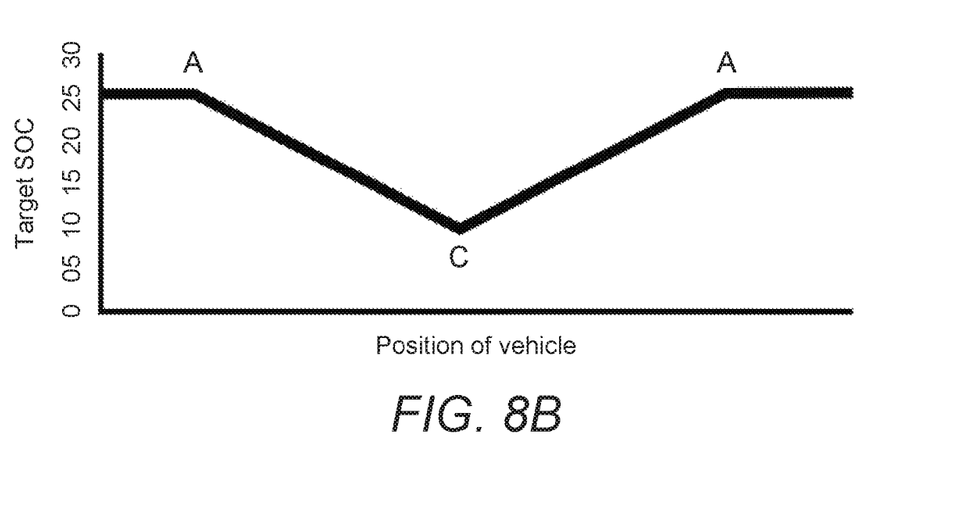
FIG. 8B shows a range-extender management graph for a vehicle on the route of FIG. 8A.

FIG. 8B shows an exemplary adjustment of the target SOC as the vehicle passes through the base area of FIG. 8A. As shown in FIG. 8B, the reduction in target SOC may be linear. The target SOC may be reduced by a fixed percentage as the vehicle is moved closer to the base by a certain pre-determined distance. For example, the target SOC may be reduced by 1% for every 800 m that the vehicle is moved closer to the base. Alternatively, the reduction may be based on an estimated route distance to drive from the current vehicle location to the base. As the vehicle moves away from the base, the target SOC is increased at the same rate.

The geo-fenced area may be the area around the base or origin of the vehicle or, alternatively, may be an area around any predetermined point. For example, a 'geo-fenced' area may be located around each of a plurality of possible charging points on a region. A plurality of geo-fenced areas may have different sizes and may have different rates of reduction for the target SOC. Such geo-fenced areas may be established as part of, or separately from, the activation schedule. A vehicle without a scheduled route may encounter one or more such geo-fenced areas and the target SOC may be adjusted accordingly.

In some embodiments, the vehicle may be switched to any mode within a geo-fenced area or geo-zone. A predetermined geo-zone may be set by a user, for example, the driver or a remote operator. In an example, the vehicle may be switched to a fully electric mode within the predetermined geo-zone, such that the range extender is turned off. In another example, the range extender may be turned on at maximum efficient or at maximum power within the predetermined geo-zone. The predetermined geo-zone may be set in advance or alternatively, may be set in real-time e.g. through a data connection.

The predetermined geo-zone may be any defined geographic area e.g. an area drawn onto a map interface, or an area defined by a certain distance from a fixed point, or a predefined location indicator (postcode or similar). The predetermined geo-zone may be time dependent. The predetermined geo-zone may be active according to e.g. the current time, day or date. Alternatively, or in addition, any of the extent, location or effect of the predetermined geo-zone may be time dependent. Such predetermined geo-zones may be established as part of, or separately from, the activation schedule. A vehicle without a scheduled route may encounter one or more such predetermined geo-zones and the vehicle mode may be switched accordingly.

Rather than a detailed map being provided to the controller 102, the controller 102 may merely be provided with information such as waypoints, changing payloads; or general route information such as the distance being driven in the inner city/motorway and the number of drop-offs. This information may be sourced directly from a separate pre-existing database, for instance, a logistics database.

In one embodiment, a central logistics database contains route information for an entire fleet of electric vehicles. By using previous data collected from electric vehicles operating the same or similar routes, target SOC profiles for each electric vehicle can be calculated and exported to the individual controllers in each electric vehicle. If the system also includes live tracking capability, measured pollution levels or information such as current traffic, weather and other live conditions that may affect local pollution levels, the target SOC profiles (or even the routes themselves) can be updated mid-journey.

Figure 9:
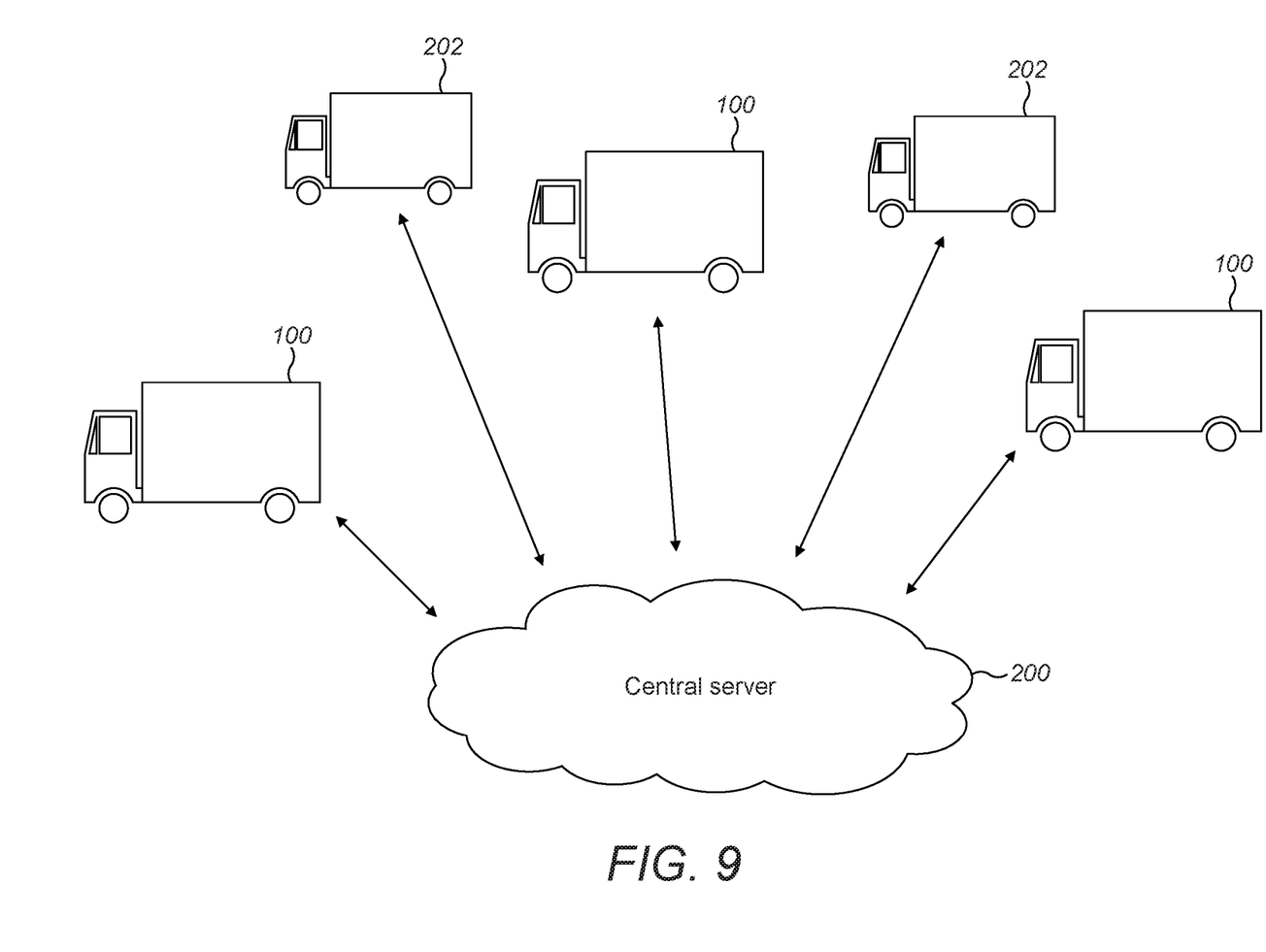
FIG. 9 shows an example system including a number of vehicles and a central server.

FIG. 9 shows a system incorporating a number of range-extended electric vehicles 100, each incorporating a controller 102 as described above. Each electric vehicle 100 is in data communication with a central server 200. This data connection may be active only when the vehicle is within a certain range (e.g. in the garage) or it may be a long-range connection so that the electric vehicles 100 are able to transmit and receive data substantially all the time. Each electric vehicle 100 logs telemetric data such as position, speed, acceleration, battery SOC, weather, drop-off locations and any other journey information to the central server 200, as well as local pollution data recorded by various instruments on the vehicle.

The central server 200 can then collate this data so as to produce a central database of previous journeys which can be used to determine target SOC profiles for future journeys, or to adjust the target SOC profile of an electric vehicle 100 currently on a journey. The latter scenario may apply if one vehicle reports low speeds at a particular location, indicating heavy traffic, the server 200 can then signal to other electric vehicles 100 to activate their range extenders earlier in the route, in order to minimise excessive particular emissions being accumulated when the vehicle is moving at low speed.

Further vehicles 202 which are not range-extended may also form part of the system, acting merely as data-loggers, for example vehicles having a smartphone or tablet with a suitable application (as described above) on board. In addition to normal telematics packages, some or all may be provided in a handheld package such as an iPhone®, iPad® or Android® device (with or without additional hardware).

The built-in GPS, accelerometers (inertial) and existing applications such as GPS and GIS (Geographical Information System) data may be utilised. The optimisation computation could be done in the cloud (or partially in the cloud and partially on board). In addition it may be optimised with 'better driving and safer driving' packages, instructing drivers on more efficient (and/or safer) driving techniques.

The data in the cloud can be aggregated for multi vehicle or even multi fleet data mining, thus effectively 'crowd sourcing' data.

Another possible application is to take into account additional (opportunistic) charging opportunities during a day. For example while a delivery truck is offloading payload at a location or when the vehicle returns to base over lunchtime.

It might not be necessary to know current payloads; instead, the system can detect actual current draw in different situations (speeds, accelerations etc.) and extrapolate from that the different loads/current draws in different (predicted) situations. Statistical analysis can identify ancillary loads such as on board refrigeration, as well as seasonal variations where extra cooling in summer or heating in winter will affect energy usage. Also knowing payload (current on vehicle and predicted changes during the day) can be used to fine tune the system.

Data may be logged from multiple periods and multiple vehicles (e.g. different vehicles of the same company) for constant optimisation of the activation schedule. This data may be subsequently used to recommend more efficient routes or changes to the vehicle's hardware (e.g. installing a bigger battery or range extender).

Variances from the expected prediction may also be accounted for by the system, for example if the vehicle has to change route. These variations can also be handled by taking into account the likelihood of a variation (frequently occurring changes vs. infrequent ones).

The GPS/telematics system can also identify the appropriate speed limit and apply speed regulation by means of regenerative braking when the speed limit is exceeded. This function could have a manual override for emergency situations and in cases of incorrect/corrupt data. The range extender may be limited to charging the battery above a certain value so that regenerative braking can always add to the SOC without overcharging the battery.

The controller, including the telematics system, is able to identify the daily route (including topography and predicted speed as well as route deviation/new route identification), initial charge state, weather conditions (wind and temperature which may also effect non-driving loads such as lights, cab heater, air conditioning or windshield wipers), traffic, payload changes during the day and vehicle load in order to iterate calculations to give an end SOC of approximately 10% (example). This will be by means of on-the-fly recalibration of the predictive model as new, more recent (and potentially more relevant) data is available to provide a more precise activation schedule.

The system is provided with a fail-safe whereby it reverts to a pre-set activation schedule in the event of lack of sufficient information or a failure. The pre-set schedule may be a generic plan such as the basic model, or a plan that is likely to be correct such as one that has recently been used by that vehicle, or a plan that is commonly used by that vehicle or the fleet the vehicle is a part of.

It will be understood that the present invention has been described above purely by way of example, and modifications of detail can be made within the scope of the invention.

Reference numerals appearing in the claims are by way of illustration only and shall have no limiting effect on the scope of the claims.

The invention claimed is:

1. A method of controlling a range extender of an electric vehicle, the method comprising:
   using actual measured or modelled pollution levels dynamically to set a target state of charge level for a range extender of an electric vehicle at a current location of the electric vehicle,
   wherein using actual measured pollution levels comprises measuring a dynamic level of pollution at the current location of the electric vehicle using one or more sensors arranged on the electric vehicle, and
   wherein using modelled pollution levels comprises:
      generating a dynamic model of pollution; and
      using the generated dynamic model to calculate the modelled pollution level at the current location of the electric vehicle at a current or future point in time;
   monitoring a state of charge of an on-board battery powering the electric vehicle; and
   activating the range extender in response to the state of charge being lower than the target state of charge level.

2. The method of claim 1, further comprising detecting the current location of the electric vehicle and limiting an operating level of the range extender based on a maximum operating level of the range extender set for the electric vehicle at the current location.

3. The method of claim 1, further comprising detecting the current location of the electric vehicle and setting an operating level of the range extender based on a predetermined operating level of the range extender set for the electric vehicle at the current location.

4. The method of claim 1, further comprising:
   identifying a projected route for the electric vehicle; and
   setting a target state of charge profile comprising the target state of charge level set for a plurality of locations on the projected route.

5. The method of claim 4, further comprising:
   calculating a journey itinerary comprising the plurality of locations on the projected route and a projected arrival time of the electric vehicle at each location,
   wherein setting the target state of charge profile comprises setting the target state of charge level for each location at the projected arrival time of the electric vehicle.

6. The method of claim 1, wherein the actual measured or modelled levels of pollution comprise levels of oxides of carbon or nitrogen, hydrocarbons, particulates or noise at one or more locations.

7. The method of claim 1, further comprising setting a maximum operating level of the range extender for the current location of the electric vehicle based on the actual measured or modelled pollution levels.

8. The method of claim 7, further comprising:
   based on a maximum level of pollution for the current location of the electric vehicle and based on the actual measured or modelled pollution levels, determining a maximum level of emissions for the range extender of the electric vehicle at the current location of the electric vehicle,
   wherein setting the maximum operating level of the range extender for the current location of the electric vehicle is further based on the determined maximum level of emissions for the range extender of the electric vehicle at the current location of the electric vehicle.

9. An apparatus for controlling a range extender of an electric vehicle, the apparatus being configured to perform operations comprising:
   using actual measured or modelled pollution levels dynamically to set a target state of charge level for a range extender of an electric vehicle at a current location of the electric vehicle,
   wherein using actual measured pollution levels comprises measuring a dynamic level of pollution at the current location of the electric vehicle using one or more sensors arranged on the electric vehicle, and
   wherein using modelled pollution levels comprises:
      generating a dynamic model of pollution; and
      using the generated dynamic model to calculate the modelled pollution level at the current location of the electric vehicle at a current or future point in time;
   monitoring a state of charge of an on-board battery powering the electric vehicle; and
   activating the range extender in response to the state of charge being lower than the target state of charge level when the electric vehicle.

10. The apparatus of claim 9, the operations further comprising detecting the current location of the electric vehicle and limiting an operating level of the range extender based on a maximum operating level of the range extender set for the electric vehicle at the current location.

11. The apparatus of claim 9, the operations further comprising detecting the current location of the electric vehicle and setting an operating level of the range extender based on a predetermined operating level of the range extender set for the electric vehicle at the current location.

12. The apparatus of claim 9, the operations further comprising:
   identifying a projected route for the electric vehicle; and
   setting a target state of charge profile comprising the target state of charge level set for a plurality of locations on the projected route.

13. The apparatus of claim 12, the operations further comprising:
   calculating a journey itinerary comprising the plurality of locations on the projected route and a projected arrival time of the electric vehicle at each location,
   wherein setting the target state of charge profile comprises setting the target state of charge level for each location at the projected arrival time of the electric vehicle.

14. The apparatus of claim 9, wherein the actual measured or modelled levels of pollution comprise levels of oxides of carbon or nitrogen, hydrocarbons, particulates or noise at one or more locations.

15. A non-transitory computer readable medium storing software code for controlling a range extender of an electric vehicle, wherein execution of the software code on a data processing apparatus causes the data processing apparatus to perform operations comprising:

using actual measured or modelled pollution levels dynamically to set a target state of charge level for a range extender of an electric vehicle at a current location of the electric vehicle, wherein using actual measured pollution levels comprises measuring a dynamic level of pollution at the current location of the electric vehicle using one or more sensors arranged on the electric vehicle, and wherein using modelled pollution levels comprises:
generating a dynamic model of pollution; and
using the generated dynamic model to calculate the modelled pollution level at the current location of the electric vehicle at a current or future point in time;

monitoring a state of charge of an on-board battery powering the electric vehicle; and activating the range extender in response to the state of charge being lower than the target state of charge level.

16. The non-transitory computer readable medium of claim 15, the operations further comprising detecting the current location of the electric vehicle and limiting an operating level of the range extender based on a maximum operating level of the range extender set for the electric vehicle at the current location.

17. The non-transitory computer readable medium of claim 15, the operations further comprising detecting the current location of the electric vehicle and setting an operating level of the range extender based on a predetermined operating level of the range extender set for the electric vehicle at the current location.

18. The non-transitory computer readable medium of claim 15, the operations further comprising:
identifying a projected route for the electric vehicle; and
setting a target state of charge profile comprising the target state of charge level set for a plurality of locations on the projected route.

19. The non-transitory computer readable medium of claim 18, the operations further comprising:
calculating a journey itinerary comprising the plurality of locations on the projected route and a projected arrival time of the electric vehicle at each location,
wherein setting the target state of charge profile comprises setting the target state of charge level for each location at the projected arrival time of the electric vehicle.

20. The non-transitory computer readable medium of claim 15, wherein the actual measured or modelled levels of pollution comprise levels of oxides of carbon or nitrogen, hydrocarbons, particulates or noise at one or more locations.

* * * * *